United States Patent [19]

Tennessen et al.

[11] Patent Number: 4,627,253
[45] Date of Patent: Dec. 9, 1986

[54] FAULT DETECTION SYSTEM FOR CONTINUOUSLY RUNNING TRANSFER PRESS

[75] Inventors: Rick L. Tennessen; Harry W. Schulz, both of Racine, Wis.; Allen J. Vanderzee, Lansing, Ill.

[73] Assignee: Verson Allsteel Press Co., Chicago, Ill.

[21] Appl. No.: 634,159

[22] Filed: Jul. 25, 1984

[51] Int. Cl.⁴ ............................................. B21D 55/00
[52] U.S. Cl. ........................................... 72/4; 72/405; 72/421; 72/1; 100/53; 192/129 A
[58] Field of Search .................... 72/405, 421, 422, 26, 72/1, 24, 4; 192/129 A; 100/53

[56] References Cited

U.S. PATENT DOCUMENTS

| | | | |
|---|---|---|---|
| 3,435,650 | 4/1969 | Forster et al. | 72/421 |
| 3,441,349 | 6/1969 | Lippke | 72/421 |
| 3,831,425 | 8/1974 | Kita | 72/421 |
| 3,862,564 | 1/1975 | Blase | 72/421 |
| 4,387,632 | 6/1983 | Heiberger | 100/53 |

Primary Examiner—Daniel C. Crane
Attorney, Agent, or Firm—Willian Brinks Olds Hofer Gilson & Lione Ltd.

[57] ABSTRACT

A continuously running mechanical transfer press includes a workpiece transfer system in which electric motors are used to provide reciprocating movements in the clamp, lift and transfer axes. An independent backup tracking system including a fault detection sensing control is provided which utilizes independent measures of the position of the workpiece transfer system in all three axes along with an independent measure of the position of the press die in its cycle to monitor proper synchronization and operation of the workpiece transfer system. The fault detection system indicates a fault in the event the transfer system loses synchronization with the moving die, in the event two separate measures of die position are not in agreement, or in the event the transfer system fails to maintain parallelism of the two transfer rails included in the system. The press is stopped in response to detection of a fault to protect the press and the transfer system from damage.

18 Claims, 4 Drawing Figures

FAULT DETECTION SYSTEM FOR CONTINUOUSLY RUNNING TRANSFER PRESS

BACKGROUND OF THE INVENTION

The present invention relates to a fault detection system for a continuously running transfer press of the type which includes a workpiece transfer system. The fault detection system of this invention automatically protects both the transfer system and the transfer press from damage in the event the transfer system fails to maintain synchronization with the transfer press.

For many years transfer systems have been used to automatically move a workpiece through a series of die stations to form both metal and nonmetal workpieces to desired shapes. In such forming operations, workpieces are formed in a series of stages by a series of mating dies. Typically, the movable dies are mounted to a reciprocating press slide or ram. Such reciprocating slides may be driven mechanically, hydraulically, pneumatically, or by various high energy techniques, such as gas combustion. The combination of a transfer system and a press is known in the industry typically as a transfer press.

Workpiece transfer systems have been used in the past with each of the types of presses mentioned above. In many applications mechanically-driven, continuously running presses provide important advantages. Mechanically-driven presses often provide particularly high production rates when used to produce metal parts.

In the past, workpiece transfer systems for use on mechanically-driven, continuous presses have typically been mechanically driven from the press drive through a series of gears and shafts, cog belts and pulleys, or chains and sprockets. Because such workpiece transfer feeds are mechanically driven from the press drive, synchronization of the transfer system with the reciprocating die mounted to the slide is automatically and precisely maintained.

The function of the transfer system is to clamp or grip the workpiece in each die with clamping fingers as the die is opening, lift the workpiece out of the lower die (on workpieces that are not lifted out of the die completely by lifting devices built into the die), transfer the workpiece to the next die, lower the workpiece onto the die, and then unclamp the fingers before the dies close. If the clamping fingers do not retract at the proper time, the clamping fingers can be crushed between the dies, thereby damaging the die, the transfer system, and the workpieces being formed.

The production rates obtainable with transfer presses are typically limited by the speed at which workpieces may be transferred without misfeeds, or by the velocity of the moving die which may be used without tearing, rupturing, or cracking the workpiece being formed. The size of workpieces produced in transfer presses has increased greatly in recent years. Similarly, the size of transfer presses has also increased, both in forming capacity and in physical dimensions. This increase in the size of parts formed in a transfer press has required an increase in the length of the clamp, lift and transfer strokes of the workpiece transfer system. Typically, each of these three motions (clamp, lift and transfer) is cyclical, stopping at the end of each stroke, dwelling, and then returning. Thus, the motions of a transfer system can be considered as intermittent, and they place fluctuating torque loads on the transfer drive. The recent increase in production rate, part size, and physical size of transfer presses has severely taxed the limits of mechanical transfer drives.

Furthermore, presses are generally started and stopped by large scale dry friction clutches and brakes. Engagement of such clutches tends to start the press abruptly, and engagement of the brake (preceded by disengagement of the clutch) stops the press abruptly. This abrupt starting and stopping of the press can have detrimental effects on mechanical transfer drive systems.

Electric motors and fluid motors and sophisticated electronic controls have been used for many industrial applications in the past. For example, coil feeding equipment has been used to feed coil stock into metal-forming presses by means of electric motors for many years. A failure in any component in the electronic control causing malfunction in the coil feed cycle in such a system causes little or no damage except to some formed parts. This is because no part of the feeding equipment extends under the moving die.

In addition, single cycle presses have been used with electric motor-driven transfer systems. The single cycle mode ensures that the transfer system is withdrawn from under the die properly before die closure is initiated. In this case, the press is started only after the transfer system has withdrawn to a safe position. The press makes one stroke and then stops with the slide in the top stroke position, at which time the unloading transfer system is moved into the die area from the unload side of the press in order to pick up the workpiece and remove the formed workpiece from the die. As the unloading transfer system is moving the formed workpiece out of the die, a sensor is tripped to initiate a loading transfer system to move the next workpiece to be formed into the die. As the loading transfer system retracts from the area of the moving die, a sensor is tripped to start the next press cycle.

In this prior art approach, any malfunction of the unloading or loading transfer systems (which prevents either of them from completing their full cycle and tripping the appropriate sensor) simply stops the production cycle without causing damage to the die or the press. Of course, such single stroking or single cycling of a press and transfer system severely inhibits the maximum production rate obtainable.

SUMMARY OF THE INVENTION

The present invention is directed to a fault detection system which can be used to protect a continuously running transfer press from damage due to a workpiece transfer system that has lost synchronization with the press.

According to this invention, a continuously running transfer press of the type comprising at least one die which moves in a cycle, a workpiece transfer system having at least one axis of movement, and a controller operative to synchronize movement of the transfer system with the phase angle of the die in the cycle is provided with a die position sensor, mounted to the transfer press to generate a die position signal indicative of the position of the die in the cycle. At least one transfer system position sensor is mounted to the transfer press to generate at least one transfer system position signal indicative of the position of the transfer system in at least one selected axis. A fault detection system is responsive to the die position signal and the transfer system position signal to generate at least one fault signal in the event the transfer system position signal fails to correspond to a predetermined function of the die position signal. The die position sensor, the transfer system sensor, and the fault detection system cooperate to monitor the operation of the transfer system and the controller independently of the controller and to generate at least one fault signal in the event the transfer system loses synchronization with the die. In the embodiments described below, the press is automatically stopped and the transfer system may be moved to a safe position away from the die in the event the fault detection system generates a fault signal.

The technology needed to synchronize electric motor-driven or fluid motor-driven devices precisely to other electric motor-driven or fluid motor-driven devices or to mechanically-driven devices has existed for many years. However, the application of such devices to continuous running presses, in situations where extensive damage can result to the equipment in the event of a malfunction, has not been done to the knowledge of the present inventors. It is believed that the reason for this is that a malfunction in such a system can damage very expensive dies and machinery and, often more significantly, can interrupt workpiece production. The time to replace dies can be many months.

The fault detection system of this invention allows a continuously running transfer press, such as a continuously running mechanical transfer press, to be built using electric motor or fluid motor drives for the workpiece transfer system. Because the fault detection system provides an independent backup protecting the transfer press and the dies from damage in the event the transfer system loses synchronization with the press, mechanical drive linkages for the transfer system can be eliminated. In this way, the high production rates obtainable with continuously running mechanical transfer presses and the flexible, efficient and high-speed transfer operations obtainable with electric motor-driven transfer systems may be combined.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
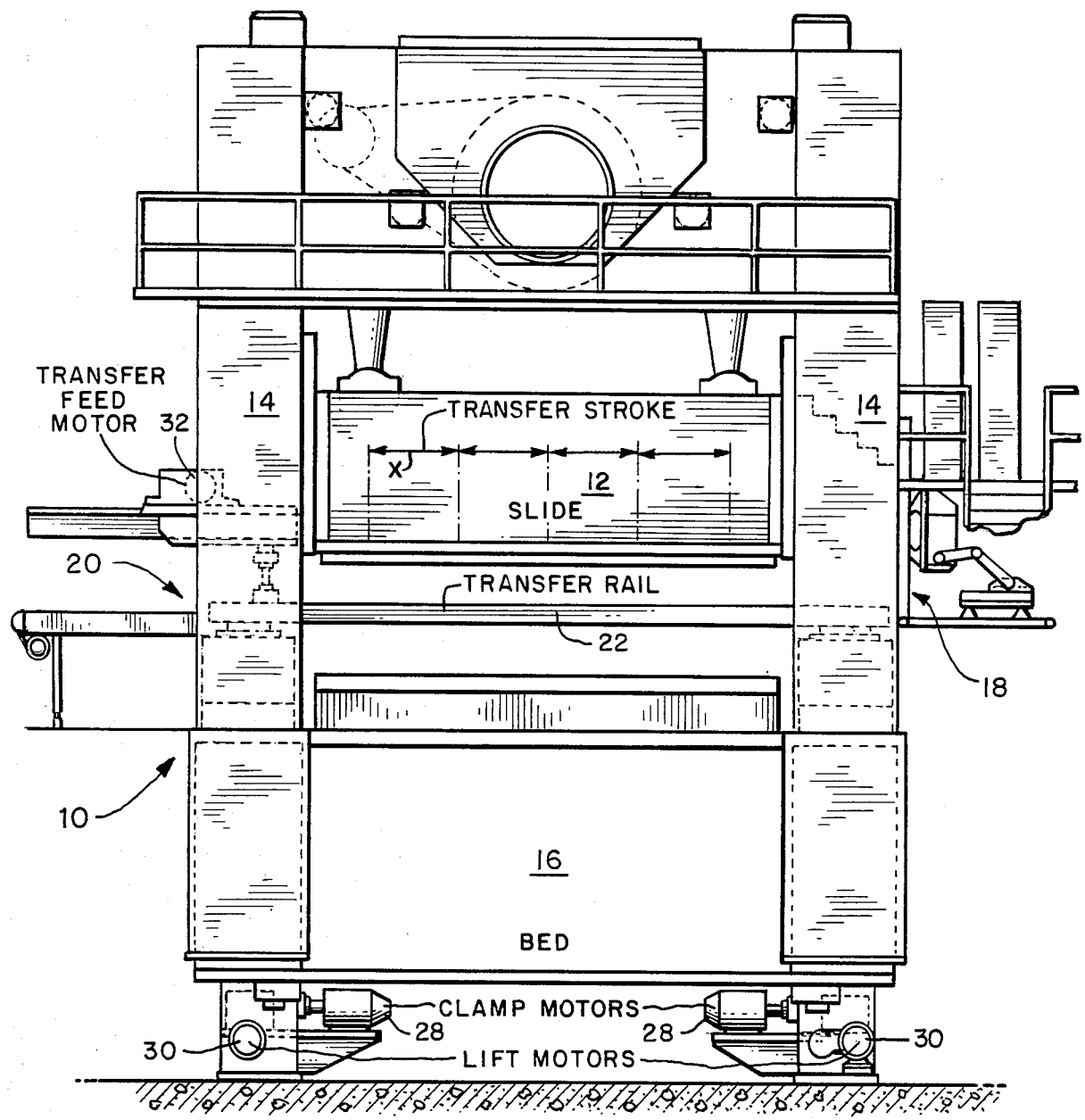
FIG. 1 is a side view of a continuously running transfer press suitable for use with this invention.
Figure 2:
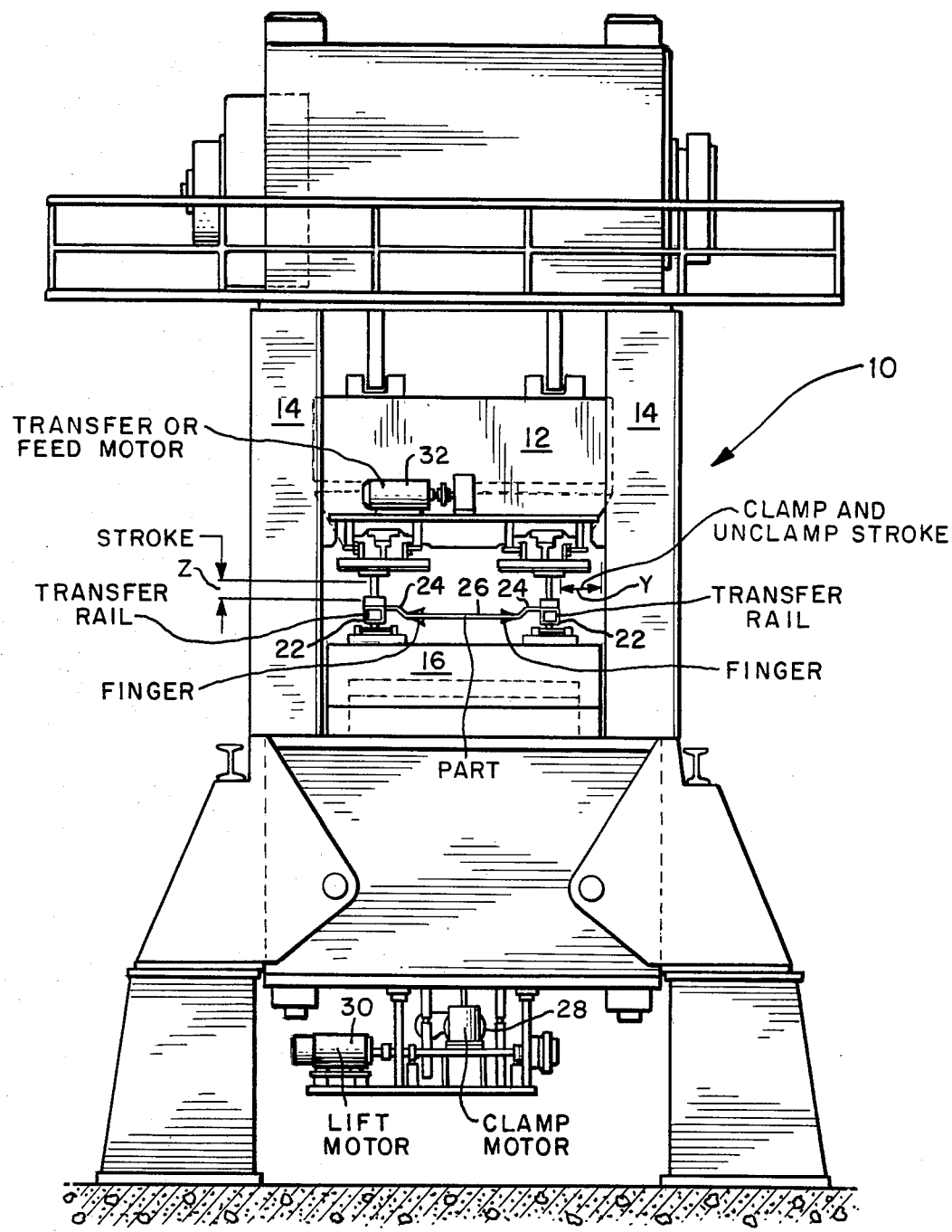
FIG. 2 is an end view of the transfer press of FIG. 1.

Turning now to the drawings, FIGS. 1 and 2 show side and end views, respectively, of a transfer press suitable for use with this invention. This transfer press 10 includes a slide 12 which is movably mounted between two pairs of columns 14 over a fixed bed 16. During operation, upper and lower dies are mounted on the slide 12 and bed 16, respectively, and the slide 12 moves in a reciprocating vertical cycle in order to form workpieces positioned between the upper and lower dies. In FIG. 1, the reference numeral 18 is used to signify the entry end of the transfer press 10 and the reference numeral 20 to signify the exit end.

Typically, multiple upper dies and multiple lower dies are mounted to the transfer press 10 and a number of consecutive forming stations are thereby provided. The transfer press 10 includes a workpiece transfer system for automatically moving workpieces between adjacent forming stations.

The workpiece transfer system includes two parallel transfer rails 22, as best shown in FIG. 2. Each of the transfer rails 22 supports a number of transfer fingers 24, which are shaped to clamp and hold a workpiece 26 between the two transfer rails 22.

In this embodiment, the workpiece transfer system is a three-axis system which moves the transfer rails 22 and thereby the transfer fingers 24 in three orthogonal axes: the clamp axis (which is horizontally oriented to vary the separation between the transfer rails 22); the lift axis (which is vertically oriented to vary the elevation of the transfer rails 22); and the transfer axis (which extends along the length of the transfer rails 22 and is used to move a workpiece 26 from one forming station to the next).

Two clamp motors 28 are provided to move the two ends of the transfer rails 24 in parallel along the clamp axis. The reference symbol Y is used in FIG. 2 to designate the maximum stroke of the clamp cycle which is available for use. Typically, when the transfer rails 22 are moved together the transfer fingers 24 are brought to a position to clamp and hold the workpiece 26. Similarly, when the clamp motors 28 move the transfer rails 22 apart, the transfer fingers 24 disengage from the workpiece 26. In order to provide proper operation, it is important that the two clamp motors 28 move the two ends of the transfer rails 22 in parallel to maintain an equal spacing between the two transfer rails 22 along their lengths.

Two lift motors 30 are also mounted in the region of the columns 14. The lift motors 30 are mechanically linked to the transfer rails 22 to move the transfer rails 22 through a maximum vertical stroke indicated by the reference symbol Z in FIG. 2. Movement of the transfer rails 22 in the Z or lift axis is used to lift a clamped workpiece 26 out of a first lower die and then to lower the clamped workpiece 26 onto a next lower die.

The transfer press 10 also includes a transfer or feed motor 32 which moves the transfer rails 22 through a maximum stroke indicated by the reference symbol X in FIG. 1. Because the transfer rails 22 are relatively rigid along their length, only a single transfer motor 32 is required in this embodiment.

Figure 3:
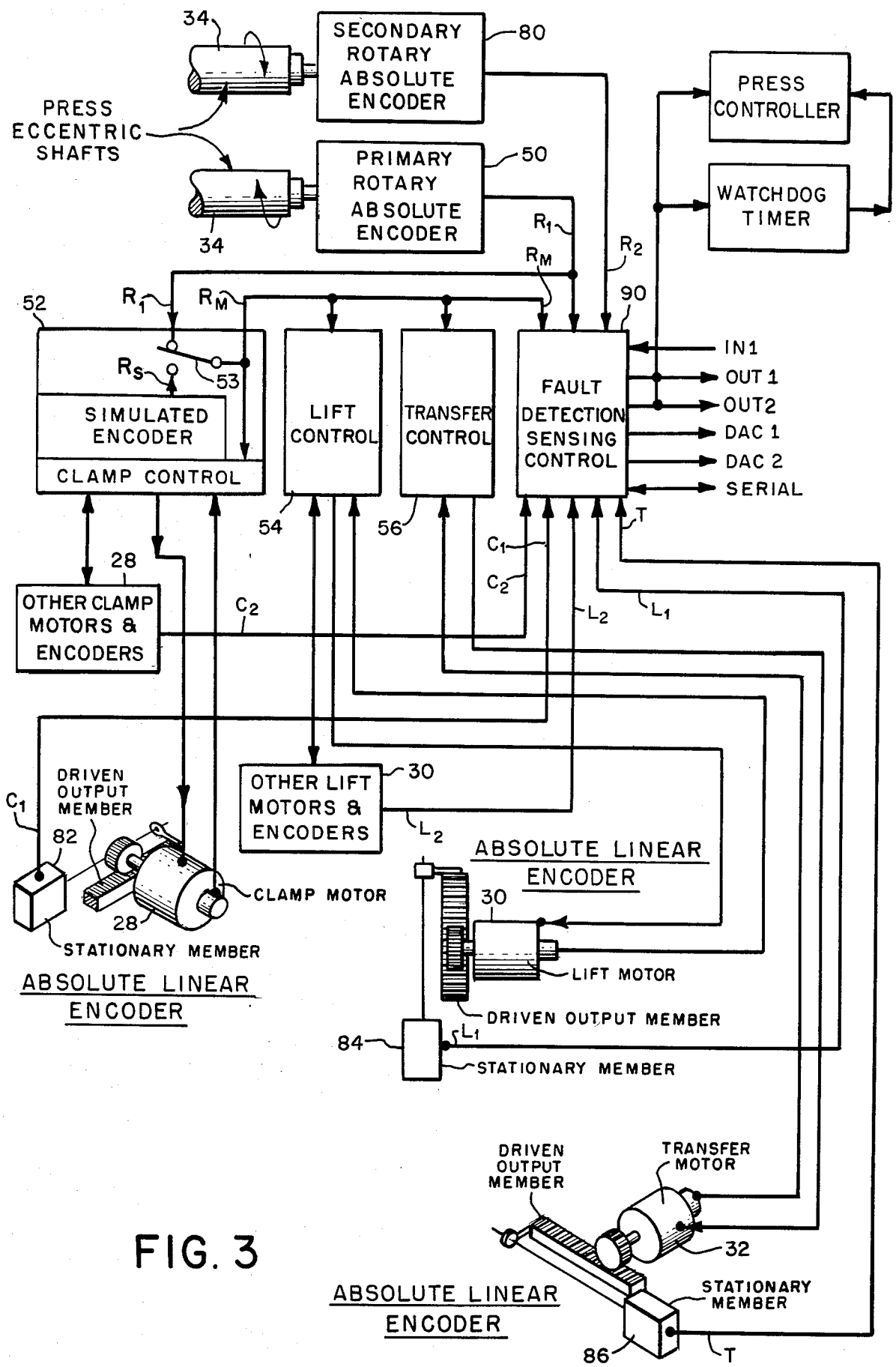
FIG. 3 is a block diagram of a presently preferred embodiment of the fault detection system of the present invention as adapted for use with the transfer press of FIGS. 1 and 2.

FIG. 3 shows a block diagram which clarifies the manner in which the motors 28, 30 and 32 are controlled. As shown in FIG. 3, the transfer press includes two eccentric shafts 34 which are part of the mechanical drive system for the slide 12. Each of the shafts 34 completes one 360° revolution during each cycle of the slide 12. Thus, the angular position of the eccentric shafts 34 provides a precise measure of the position or phase angle of the slide 12 and therefore the movable die in the die cycle. A first rotary absolute encoder 50 is mounted to a first one of the eccentric shafts 34 to generate a first die position signal $R_1$. In this embodiment, the first die position signal $R_1$ is a 12-bit signal which indicates in absolute terms the angular position of the eccentric shaft 34.

This die position signal $R_1$ is applied as an input to a clamp control 52. The clamp control includes a simulated encoder which generates a simulated die position signal $R_S$ which is independent of $R_1$. The clamp control generates a master die position signal $R_M$ which is equal either to $R_1$ or $R_S$, depending on the state of the switch 53.

The clamp control 52 controls the clamp motors 28 in response to the master die position signal $R_M$ in order to synchronize movement of the clamp motors 28 and thereby the transfer rails 22 to obtain a predetermined clamp cycle in synchrony with $R_M$. The clamp control 52 can be any of a number of conventional control systems well known to those skilled in the art. Such control systems are used to control the acceleration, deceleration, and velocity of the clamp motors 28 and thereby the position of the respective driven output members to predetermined, precisely defined mathematical curves. When $R_M$ is equal to $R_1$, the clamp motors 28 are controlled and synchronized precisely with respect to the mechanically driven, continuously running press slide 12 such that the transfer rails 22 remain synchronized with the slide 12 automatically when the press 10 is started and stopped. The clamp control 52 may employ minicomputers or microprocessors in conjunction with programmable solid state controls.

The master die position signal $R_M$ is also applied as an input to a lift control 54 and a transfer control 56. The lift control 54 controls the lift motors 30 and the transfer control 56 controls the transfer motor 32 in a manner similar to that described above in conjunction with the clamp control 52. In practice, precise, predetermined mathematical curves are stored or generated for each of the clamp, lift, and transfer cycles, and the controllers 52,54,56 command the motors 28,30,32, respectively, to move the transfer rails 22 to follow the respective stroke cycles.

Each of the motors 28,30,32 operates in forward and reverse to provide advance and return through the respective cycle. Thus, the clamp motors 28 cause the transfer fingers 24 to clamp onto the workpiece 26 and to release the workpiece 26 at the appropriate times. Similarly, the lift motors 38 cause the transfer rails 22 and therefore the transfer fingers 24 to be lifted and then lowered at appropriate times with respect to the position of the slide 12 in the die cycle. Finally, the transfer motor 32 causes the transfer rails 22 to be advanced from one forming station to the next and then returned at the appropriate times.

Complex and sophisticated control systems such as that described above are vulnerable to many different failure modes. At present, it is not practical to attempt to monitor the multitude of electronic and solid state devices for possible failure on a continuous basis.

The control system described above operates to synchronize the motor-driven workpiece transfer system to the mechanically driven press in a precise manner, even through the transfer system drive system is mechanically independent of the mechanical press drive system. However, this control system provides little or no protection against malfunctioning of an electronic or solid state component or circuit within the system, or disturbance caused by electrical noise. When such a malfunction occurs, the electric motor drive system for the workpiece transfer system may move in an erratic or uncontrolled manner.

According to the presently preferred embodiment of this invention, a fault protection system is provided which automatically and continuously monitors the performance of the transfer system drive system and ensures proper synchronized positioning of the transfer rails 22 in each of the transfer feed axes (clamp, lift and transfer). In this preferred embodiment, a second rotary encoder 80 is mounted to a second one of the eccentric shafts 34 of the transfer press 10 to generate a second die position signal $R_2$ which is independent of the first die position signal $R_1$. Furthermore, position encoders such as linear absolute encoders 82,84,86 are positioned on each of the driven output members. Thus, each of the clamp motors 28 drives a respective driven output member, and a respective absolute linear encoder 82 is provided on each such driven output member. In the embodiment of FIGS. 1 and 2, there are two clamp motors 28 and therefore two absolute linear encoders 82. Each of these encoders 82 generates a respective signal $C_1,C_2$ indicative of the absolute position of the respective driven output member. As explained above, it is important that the transfer rails 22 remain parallel to one another as they are moved in the clamp and lift axes. For this reason, the clamp position signals $C_1,C_2$ should be substantially equal to one another when the control system is operating properly.

In the embodiment of FIGS. 1 and 2, two separate absolute linear encoders 84 are provided for the lift axis. Each of the encoders 84 generates a respective lift position signal $L_1,L_2$ as a function of the absolute position of the respective driven output member driven by the lift motors 30. As with the clamp axis, when the control system is operating properly, the lift position signals $L_1$ and $L_2$ should be substantially equal. The absolute linear encoder 86 is mounted to the driven output member driven by the transfer motor 32 to generate a transfer position signal T indicative of the absolute position of the driven output member coupled to the transfer motor 32.

In many cases, complex mechanical linkages may be required between the motors 28,30,32 and the transfer rails 22. Preferably, the driven output members to which the encoders 82,84,86 are responsive should move directly with the transfer rails 22 such that the position signals $C_1,C_2,L_1,L_2,T$ accurately reflect the positions of the transfer rails 22.

A fault detection sensing control 90 is provided which receives as inputs the three die position signals $R_1,R_2,R_M$, as well as the five transfer system position signals $C_1,C_2,L_1,L_2,T$ described above. It is important to recognize that the second die position signal $R_2$ and the transfer system position signals $C_1,C_2,L_1,L_2,T$ are completely independent from the control system made up of the first rotary encoder 50, the controls 52,54,56, and the motors 28,30,32. The fault detection sensing control 90 compares these various inputs in order to check the proper operation of the transfer system on a continuous and automatic basis.

As shown in FIG. 3, the fault detection sensing control 90 includes various other inputs and outputs. A serial interface is used to transfer data serially to and from the fault detection sensing control 90, as for example, from a keyboard. The two outputs labeled DAC1 and DAC2 are digital-to-analog converter outputs by which digital information can be output, as for example, to a D to A converter which is coupled to a strip chart. The outputs OUT1 and OUT2 are parallel binary bit output ports which are used to indicate the status and operation of the fault detection sensing control 90 and to identify any detected faults. The input labeled IN1 is a parallel binary bit input port in which additional information is provided to the fault detection sensing control 90 regarding the status of the transfer press 10 and the controls 52,54,56. Tables 1, 2 and 3 identify the individual bits and their function in the input port IN1 and the output ports OUT1 and OUT2.

Figure 4:
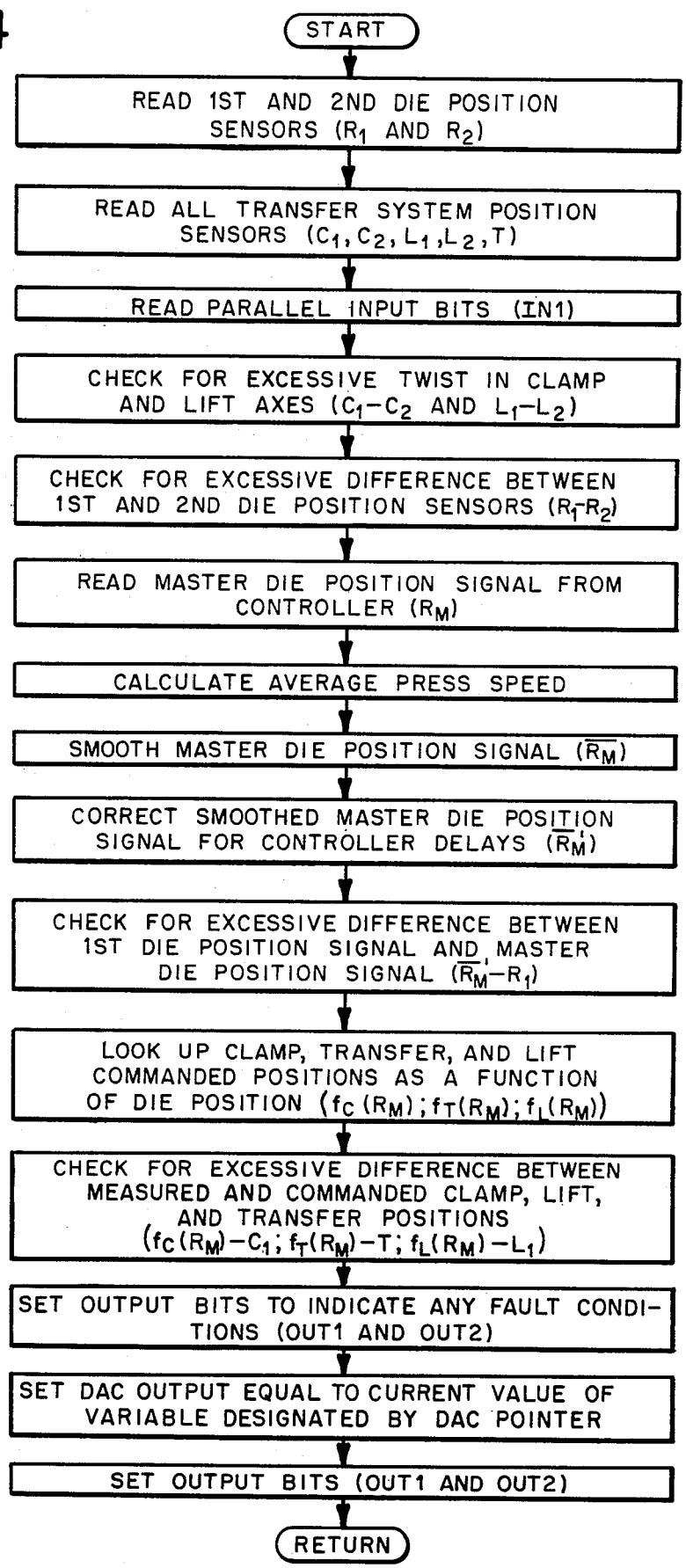
FIG. 4 is a flow chart of the program executed by the fault detection system of FIG. 3.

The fault detection sensing control 90 is a microprocessor-based system which executes the program flowcharted in FIG. 4 ninety times a second. As shown in FIG. 4, the first step in this repeatedly executed program is to read the first and second die position signals $R_1, R_2$. As explained above, the encoders 50,80 operate as independent sensors of the position of the moving die within the die cycle. Next, the transfer system position signals $C_1, C_2, L_1, L_2, T$ are read from the encoders 82,84,86 which function as transfer system position sensors.

The fault detection sensing control 90 then reads the parallel input bits IN1. The function of these input bits will be described in detail below.

The fault detection sensing control 90 then performs a check of excessive twist in both the clamp and the lift axes. During normal operation $C_1$ should equal $C_2$, and $L_1$ should equal $L_2$. During this step, the fault detection sensing control 90 compares the difference between $C_1$ and $C_2$ with a predetermined clamp twist limit and signals a fault if this difference exceeds the limit. Similarly, the difference between $L_1$ and $L_2$ is obtained and compared with a lift twist limit. Once again, a fault is signalled in the event the lift difference exceeds the lift twist limit.

Next, the fault detection sensing control 90 checks for excessive difference between $R_1$ and $R_2$. The difference between $R_1$ and $R_2$ is compared with a predetermined rotary encoder limit and a fault is signalled in the event this limit is exceeded.

The master die position signal $R_M$ is then read from the clamp control 52, and the average press speed is calculated from $R_M$. As explained previously, the two encoders 50,80 are both 12-bit absolute angle encoders and it has been found that the digitization errors resulting from the incrementing of the 12-bit signal $R_M$ can lead to calculational problems. For this reason, the fault detection sensing control 90 maintains a smoothed 20-bit signal $\overline{R_M}$ corresponding to $R_M$ modified by the calculated average press speed. This 20-bit signal varies in a smoother fashion than the 12-bit $R_M$ signal.

Next, $\overline{R_M}$ is corrected for controller delays to generate $\overline{R_M}'$. Because of the processing required in the clamp controller 52, the signal $\overline{R_M}$ lags the signal $R_1$ by a predetermined time interval. The fault detection sensing control 90 corrects $\overline{R_M}$ for this lag based on the measured average press speed currently prevailing.

When the transfer system is following the press, the fault detection sensing control then checks for excessive difference between $R_1$ and $\overline{R_M}'$. In the event this difference exceeds a predetermined limit, a fault condition is signalled.

The fault detection sensing system maintains a 256-entry table for each of the three clamp, transfer and lift axes. These tables are automatically generated once parameters identifying the commanded positions of the transfer system in the clamp, transfer and lift axes have been entered. During the time these tables are being calculated, Bit No. 1 and the relevant ones of Bits 6, 7 and 8 of the output port OUT1 are set to indicate that the fault detection system not ready to monitor for faults. During operation of the fault detection sensing control, the signal $R_M$ is used as a pointer to look up the commanded positions of the transfer system in the clamp, transfer and lift axes as a function of measured die position in order to determine $f_C(R_M)$, $f_T(R_M)$ and $f_L(R_M)$, the commanded positions of the clamp, transfer and lift axes, respectively. Linear interpolation is used between adjacent ones of the 256 entries in each of the tables. Then the control 90 checks for excessive following error. That is, the difference between the measured and commanded positions in the clamp axis $(f_C(R_M) - C_1)$, in the transfer axis $(f_T(R_M) - T)$, and in the lift axis $(f_L(R_M) - L_1)$ is determined, and an error condition is signalled in the event any of these differences exceed predetermined limits. For example, $L_1$ is compared with the value obtained from the lift table lookup and an error condition signalled in the event the difference between these two numbers is excessive.

After all of these tests (1) for difference errors between $R_1$, $R_2$ and $R_M$, (2) for twist errors between $L_1$ and $L_2$ and $C_1$ and $C_2$, and (3) for following errors in each of the clamp, transfer and lift axes have been completed, the output bits of port OUT2 and Bit 0 of port OUT1 are set to indicate any fault conditions that have been detected.

Finally, the DAC output is set equal to the current value of any variable designated by the DAC pointer and the output bits OUT1 and OUT2 are set. The DAC output can be used, for example, to monitor the amount of the difference between $R_1$ and $R_2$ or the difference between $L_1$ and $L_2$. This feature is useful during setup procedures when the various limits are being set.

A number of other features of the fault detection sensing control also provide operating advantages. The control 90 monitors the average speed of the press 10 and sets Bit 3 of port OUTI in the event the press operates at excessive speed. Also, the control 90 inverts Bit 11 of port OUT1 ninety times a second. Bit 11 of OUT1 is used as an input to a watchdog timer which signals a fault in the event Bit 11 is not set consistently ninety times a second. Bit 11 is used by the watchdog timer to monitor proper operation of the control 90 and to stop the press 10 in the event the control 90 is not operating.

Other inputs received by the control 90 are shown in Table 1. Bit 0 of IN1 indicates whether or not the clamp, lift and transfer motors 28,30,32 are powered. Bits 3, 4 and 5 indicate whether the incremental encoders used by the controllers 52,54,56 to monitor the position of the motors 28,30,32, respectively, are referenced to an absolute origin. Finally, Bits 6, 7 and 8 of IN1 indicate whether the controllers 52,54,56 are commanding the respective drive motors 28,30,32 as a function of $R_M$ or alternately in a manner independent of $R_M$, as for example when under manual control.

The fault detected output (Bit 0 of OUT1) is used to control the press in order to protect the press, the dies, and the transfer system from damage in the event any one of the faults described above is detected. Two alternative approaches can be used to perform this function. The first is simply to stop the press as soon as a fault has been detected, as indicated by Bit 0 of OUT1. In this way, the moving die is brought to a rest as soon as possible, thereby preventing operation of the press in the event the transfer system exhibits excessive twist or fails to follow the die properly, or in the event the angle encoders fail to agree. A second approach is automatically to move the transfer system to a safe position, away from the moving die, in response to the detection of a fault. Of course, the press can be stopped as well, as described above. The advantage of this second approach is that further protection is provided to the press and the transfer system during the period when the press is decelerating after it has been commanded to stop.

From the foregoing description, it should be apparent that the fault detection system provides an independent check on proper operation of the transfer system. Should the first encoder 50, or any of the controllers 52,54,56, or any of the motors 28,30,32, or any of the associated linkages malfunction, the fault detection system would detect a deviation from precise synchronization in the respective axis or axes, and the press would be stopped to prevent serious damage. As pointed out above, the first rotary encoder 50 supplies the signal $R_1$ to the controllers 52,54,56 which command the motors 28,30,32 to move in synchronization with the press slide 12 and the moving dies. A second, independent rotary encoder 80 provides an independent signal $R_2$ to the fault detection sensing control 90, and the encoders 82,84,86 provide signals indicative of the actual position of the transfer rails 22 in each respective axis. Thus, the fault detection sensing control 90 is an independent backup tracking system that is able to detect both sensing errors of the rotary encoders 50,80, control errors of the controllers 52,54,56, drive errors of the motors 28,30,32, and mechanical errors in the drive linkages of the respective motors. For example, if a shaft key is sheared or falls out and prevents the respective output motion from travelling its specified distance within the specified time, the resulting deviation in position of the transfer rails 22 is sensed by the fault detection sensor control 90.

Of course, it should be understood that a wide range of changes and modifications can be made to the preferred embodiment described above. The present invention can readily be adapted to transfer systems with either a greater or lesser number of axes of motion. For example, this invention can be used effectively in a single axis transfer system in which a workpiece is simply transferred from one forming station to the next. Furthermore, this invention can readily be adapted to systems in which as few as one or as many as three or more separate motors are provided in each of the feed axes. For example, in a complex 3-column press, it may be preferable to have three separate clamp motors and three separate lift motors. In this case, it is preferable to check the twist of all the position signals for each of the axes of the transfer system. Moreover, this invention is not limited to use with electric motor-driven transfer systems; it can for example readily be adapted for use with fluid motor-driven transfer systems.

It is therefore intended that the foregoing detailed description be regarded as illustrative rather than limiting and that it be understood that it is the following claims, including all equivalents, which are intended to define the scope of this invention.

TABLE 1

| Bit No. | PARALLEL INPUTS - IN1 Information |
|---|---|
| 0 | Whether the clamp, lift and transfer motors are powered. |
| 1 | Whether the transfer press drive clutch is engaged. |
| 3 | Whether the clamp incremental encoder is referenced. |
| 4 | Whether the transfer incremental encoder is referenced. |
| 5 | Whether the lift incremental encoder is referenced. |
| 6 | Whether the clamp is synchronized. |
| 7 | Whether the transfer is synchronized. |
| 8 | Whether the lift is synchronized. |

TABLE 2

| Bit No. | PARALLEL OUTPUTS - OUT1 Information |
|---|---|
| 0 | Whether a fault has been detected. |
| 1 | Whether the fault detection system is ready to monitor for faults. |
| 3 | Whether the press is operating at excessive speed. |
| 6 | Whether the clamp table is ready. |
| 7 | Whether the transfer table is ready. |
| 8 | Whether the lift table is ready. |
| 10 | Whether the calculated encoder value tracks the measured encoder value. |
| 11 | Whether the fault detection system is operating (to watchdog timer). |

TABLE 3

| Bit No. | PARALLEL OUTPUTS - OUT2 Information |
|---|---|
| 0 | Clamp twist detected. |
| 2 | Lift twist detected. |
| 3 | Clamp following error detected. |
| 4 | Transfer following error detected. |
| 5 | Lift following error detected. |
| 6 | Difference error between rotary encoders detected. |
| 7 | Difference error between rotary encoder and master position signal detected. |

We claim:

1. In a continuously running transfer press of the type comprising at least one die which moves in a cycle, a workpiece transfer system having at least one axis of movement, and a controller comprising means for sensing the phase angle of the die in the cycle and means for controlling the transfer system to synchronize movement of the transfer system with the phase angle of the die in the cycle, the improvement comprising:
 a die position sensor mounted to the transfer press to generate a die position signal indicative of the momentary position of the die in the cycle at a multiplicity of phase angles of the die in the cycle;
 at least one transfer system position sensor mounted to the transfer press to generate at least one transfer system position signal indicative of the momentary position of the transfer system in at least one selected axis at said multiplicity of phase angles;
 a fault detection system responsive to the at least one die position signal and the transfer system position signal, said fault detection system comprising means for comparing the die position signal and the transfer system position signal at said multiplicity of phase angles of the die in the cycle, and means for generating at least one fault signal in the event the at least one transfer system position signal faults to correspond to a predetermined function of the die position signal;
 said die position sensor, at least one transfer system sensor and fault detection system cooperating to monitor the operation of the transfer system and the controller independently of the controller and to generate the at least one fault signal in the event the transfer system loses synchronization with the die.

2. The invention of claim 1 wherein the die is mechanically driven by a rotatable shaft, and wherein the workpiece transfer system is electrically driven by at least one electrical motor which is mechanically independent of the rotatable shaft.

3. In a continuously running transfer press of the type comprising at least one die which moves in a cycle, a workpiece transfer system having at least one axis of movement, and a controller operative to synchronize movement of the transfer system with the phase angle of the die in the cycle, the improvement comprising:
 a first die position sensor mounted to the transfer press to generate a die position signal indicative of the position of the die in the cycle;
 at least one transfer system position sensor mounted to the transfer press to generate at least one transfer system position signal indicative of the position of the transfer system in at least one selected axis;
 a fault detection system responsive to the at least one die position signal and the transfer system position signal to generate at least one fault signal in the event the at least one transfer system position signal fails to correspond to a predetermined function of the die position signal;
 said die position sensor, at least one transfer system sensor and fault detection system cooperating to monitor the operation of the transfer system and the controller independently of the controller and to generate the at least one fault signal in the event the transfer system loses synchronization with the die;
 an additional die position sensor mounted to the transfer press to generate; an additional die position signal indicative of the position of the die in the cycle; and
 means, included in the fault detection system, for generating the at least one fault signal in the event the first die position signal fails to correspond to the additional die position signal.

4. The invention of claim 3 wherein the die position sensor and the additional die position sensor comprise respective rotary absolute encoders.

5. In a continuously running transfer press of the type comprising at least one die which moves in a cycle, a workpiece transfer system having at least one axis of movement and driven by at least two motors operating in parallel, and a controller operative to synchronize movement of the transfer system with the phase angle of the die in the cycle, the improvement comprising:
 a die position sensor mounted to the transfer press to generate a die position signal indicative of the position of the die in the cycle;
 at least two transfer system position sensors mounted to the transfer press to generate at least two transfer system position signals, each indicative of the position of a respective portion of the transfer system in at least one selected axis;
 a fault detection system responsive to the at least one of the die position signals and the transfer system position signals to generate at least one fault signal in the event at least one of the transfer system position signals fails to correspond to a predetermined function of the die position signal;
 said die position sensor, transfer system sensors and fault detection system cooperating to monitor the operation of the transfer system and the controller independently of the controller and to generate the at least one fault signal in the event the transfer system loses synchronization with the die; and
 means included in the fault detection system for generating the at least one fault signal in the event the two transfer system position signals fail to correspond to one another.

6. The invention of claim 1 further comprising means for automatically stopping the transfer press in response to the at least one fault signal.

7. The invention of claim 1 further comprising means for automatically moving the transfer system to a safe position, away from the die, in response to the at least one fault signal.

8. In a continuously running mechanical transfer press of the type comprising at least one die which moves in a die cycle and a workpiece transfer system having at least one axis of movement, the improvement comprising:
 first and second die sensor means for generating independent first and second die position signals, respectively, each of which provides an independent measure of the position of the die in the cycle;
 at least one electrically powered drive means, coupled to the transfer system, for moving a portion of the transfer system in said at least one axis of movement;
 controller means, responsive to the first die position signal, for controlling movement of the electrical motor in synchrony with movement of the die in the cycle to cause said portion of the transfer system to move in a predetermined transfer cycle synchronized with the die cycle;
 at least one transfer system sensor means, independent of the controller means, for generating at least one transfer system position signal indicative of the position of the portion of the transfer system;
 a fault detection system responsive to the first and second die position signals and the transfer position signal;
 means, included in the fault detection system, for generating a fault signal in the event the first and second die position signals fail to correspond to one another;
 means, included in the fault detection system, for generating the fault signal in the event the transfer system position signal fails to correspond to a predetermined function of one of the die position signals; and
 means for controlling the transfer press in response to the fault signal to protect the die from damage through destructive contact with the workpiece transfer system.

9. The invention of claim 8 wherein the means for controlling the transfer press automatically stops the press in response to the fault signal.

10. The invention of claim 8 wherein the means for controlling the transfer press automatically moves the workpiece transfer system to a safe position, away from the die, in response to the fault signal.

11. The invention of claim 8 wherein the drive means comprises two electrical motors adapted to function in parallel to move the portion of the transfer system; wherein the at least one transfer system position signal comprises two transfer system position signals; and wherein the fault detection system further comprises means for generating the fault signal in the event the two transfer system position signals do not correspond to one another.

12. In a continuously running mechanical transfer press of the type comprising at least one die which moves in a die cycle in phase with at least one rotary shaft, and a workpiece transfer system having a workpiece transfer element which moves in a transfer cycle;

first and second absolute angle encoders, both mechanically linked to the at least one shaft to generate respective first and second die position signals, both providing independent indications of the position of the die in the die cycle;

first and second electric motors linked to the transfer element to move respective spaced portions of the transfer element in parallel in the transfer cycle;

controller means, responsive to the first die position signal, for commanding the first and second motors to move the spaced portions of the transfer element in parallel through the transfer cycle in synchronization with the die cycle;

first and second absolute linear encoders, each mechanically linked to a respective one of the spaced portions of the transfer element to generate respective first and second transfer element position signals;

a fault detection system responsive to the first and second die position signals and the first and second transfer position signals;

means, included in the fault detection system, for generating a fault signal in the event the first die position signal deviates excessively from the second die position signal, thereby checking proper operation of the first and second absolute angle encoders;

means, included in the fault detection system, for generating the fault signal in the event the first transfer element position signal deviates excessively from the second transfer element position signal, thereby checking proper parallel movement of the spaced portions of the transfer element;

means, included in the fault detection system, for generating the fault signal in the event one of the transfer element position signals deviates excessively from a predetermined function of one of the die position signals, thereby checking proper operation of the controller means and motors; and means for automatically protecting the die from destructive contact with the transfer element in response to the fault signal.

13. The invention of claim 12 wherein the protecting means automatically stops the press in response to the fault signal.

14. The invention of claim 12 wherein the protecting means automatically moves the transfer element to a safe position, away from the die, in response to the fault signal.

15. The invention of claim 3 wherein the die position signals are each continuously indicative of the momentary position of the die in the cycle, wherein the transfer position signal is continuously indicative of the momentary position of the transfer position, and wherein the fault detection system comprises means for comparing at least one of the die position signals and the transfer system position signal at a multiplicity of phase angles of the die in the cycle.

16. The invention of claim 5 wherein the die position signal is continuously indicative of the momentary position of the die in the cycle, and wherein the transfer system position signals are each continuously indicative of the momentary position of the respective portions of the transfer system, and wherein the fault detection system comprises means for comparing the die position signal with at least one of the transfer system position signals at a multiplicity of phase angles of the die in the cycle.

17. The invention of claim 8 wherein the die position signals are each continuously indicative of the momentary position of the die in the cycle, and wherein the transfer position signals is continuously indicative of the momentary position of the portion of the transfer position, and wherein the fault detection system comprises means for comparing at least one of the die position signals and the transfer system position signal at a multiplicity of phase angles of the die in the cycle.

18. The invention of claim 12 wherein the die position signals are each continuously indicative of the momentary position of the die in the cycle, and wherein the transfer element position signals are each continuously indicative of the momentary position of the respective portions of the transfer element, and wherein the fault detection system comprises means for comparing at least one of the die position signals with at least one of the transfer system position signals at a multiplicity of phase angles of the die in the cycle.

* * * * *